United States Patent [19]
Christiano et al.

[11] Patent Number: 6,136,917
[45] Date of Patent: Oct. 24, 2000

[54] STABLE DISPERSIBLE SILICONE COMPOSITIONS

[75] Inventors: Steven Patrick Christiano; Gregory Gerald Bausch, both of Midland; Lauren Marie Tonge, Sanford; Sharon Kay McCoy, Gladwin, all of Mich.; Elizabeth Fiona Mallen, Brussells, Belgium; Roger Jeffery Jones, Jauche, Belgium; Athanasios Surutzidis, Wemmel, Belgium; Andrew Albon Fisk, Strombeek-Bever, Belgium

[73] Assignee: Dow Corning Corporation, Midland, Mich.

[21] Appl. No.: 08/096,345

[22] Filed: Jul. 22, 1993

[51] Int. Cl.$^7$ .................................................. C08K 5/5415
[52] U.S. Cl. ......................... 524/588; 524/731; 524/863; 516/23
[58] Field of Search ...................... 252/321, 358; 524/268, 389, 492, 588, 730, 731, 863; 516/23

[56] References Cited

U.S. PATENT DOCUMENTS

| | | |
|---|---|---|
| 2,676,182 | 4/1954 | Daudt et al. . |
| 3,784,479 | 1/1974 | Keil . |
| 3,984,347 | 10/1976 | Keil . |
| 4,005,044 | 1/1977 | Raleigh . |
| 4,021,365 | 5/1977 | Sinka et al. . |
| 4,076,648 | 2/1978 | Rosen . |
| 4,274,977 | 6/1981 | Koerner et al. . |
| 4,285,841 | 8/1981 | Barrat et al. . |
| 4,507,219 | 3/1985 | Hughes . |
| 4,639,489 | 1/1987 | Aizawa et al. . |
| 4,749,740 | 6/1988 | Aizawa et al. . |
| 4,973,416 | 11/1990 | Kennedy . |
| 4,978,471 | 12/1990 | Starch . |
| 4,983,316 | 1/1991 | Starch . |

FOREIGN PATENT DOCUMENTS

| | | |
|---|---|---|
| 75771 | 7/1987 | Australia . |
| 217501 | 4/1987 | European Pat. Off. . |
| 341952 | 11/1989 | European Pat. Off. . |
| 499364 | 8/1992 | European Pat. Off. . |
| 56-139107 | 10/1981 | Japan . |

*Primary Examiner*—Robert Dawson
*Attorney, Agent, or Firm*—Timothy J. Troy

[57] ABSTRACT

The compositions of the present invention consist essentially of (I) a reaction product, (II) a nonaqueous liquid continuous phase, and (III) a moderately hydrophobic particulate stabilizing aid. Component (I) is prepared by heating a mixture of (i) a polyorganosiloxane fluid, (ii) a silicon compound, (iii) a finely divided filler and (iv) a catalytic amount of a compound for promoting the reaction of components (i) to (iii) at a temperature of 50° C. to 300° C. The compositions of the present invention can additionally contain (IV) at least one nonionic silicone surfactant, and (V) a nonreinforcing inorganic filler.

38 Claims, No Drawings

STABLE DISPERSIBLE SILICONE COMPOSITIONS

BACKGROUND OF THE INVENTION

The present invention relates to a dispersible antifoam formulation containing a silicone for incorporation into concentrated liquid detergents wherein the antifoam formulation provides a stable, uniform detergent with controlled foaming behavior.

A defoamer or antifoam agent is a material which, when added in low concentration to a foaming liquid controls the foam problem. The defoamer equilibrates the rate of foam collapse with the rate of foam formation. Such materials, in addition, remove unsightly and troublesome surface foam, improve filtration, watering, washing, and drainage, of various types of suspensions, mixtures, and slurries. Defoamers have found application traditionally in such areas of use as the pulp and paper industry, paints and latex, coating processes, fertilizers, textiles, fermentation processes, metal working, adhesive, caulk and polymer manufacture, the sugar beet industry, oil well cement, cleaning compounds, cooling towers, and in chemical processes of varied description, such as municipal and industrial primary and secondary waste water treatment facilities. It is essential for a defoamer that it be inert and not capable of reacting with the product or system in which it is used, and that it have no adverse affect on the product or system.

The inclusion of a silicone defoamer or silicone antifoam agent in a liquid detergent is not new, however, it is uncommon. The reason is that it is particularly difficult to homogeneously disperse antifoam formulations into aqueous mediums such as liquid detergents. A liquid detergent is a complex chemical formulation and often the complexity of such formulations hinder a homogeneous dispersion of an antifoam composition in the detergent. The result is often loss of uniformity, as well as flocculates of antifoam accumulating at the surface of the detergent. One of the overriding trends of today is the move toward more concentrated liquid detergents. This shift offers the inherent efficiency of manufacture and use of liquid formulas, such as pumpability and easy measuring of liquids, while reducing the burden of packaging and shipping costs. This trend is occurring in both the consumer market products and in industrial formulations.

The move toward concentrated liquids usually entails the reduction of water content in a formulated liquid. This results in an increase in electrolyte and solids levels in these liquid detergent formulas. Another change is the dependence on non-aqueous solvents to aid in the solubilization of detergent components such as surfactants. Both of these changes make stabilization of antifoam droplets against physical separation and/or aggregation phenomena more difficult.

Many silicone containing antifoam compositions have been described in the art. Thus, for example, Rosen, in U.S. Pat. No. 4,076,648, teaches self-dispersible antifoam compositions consisting essentially of a lipophilic nonionic surface active agent homogeneously dispersed in a non-emulsified diorganopolysiloxane antifoam agent. This combination is said to promote dispersibility in water without the need for emulsification.

Sinka et al, in U.S. Pat. No. 4,021,365, discloses defoamer compositions having improved stability which are prepared from hydrophobic silica, quick-chilled amides, and hydrocarbon oil, with oil soluble organic polymers and surface active additives as optional ingredients. The defoamer compositions are described as being useful in defoaming aqueous systems including paper pulp black liquors, water-base paints, and adhesives.

Raleigh, in U.S. Pat. No. 4,005,044 discloses an antifoam composition and method with a silazane treated precipitated silica added to aqueous emulsions of silicone oil with organic nonionic surfactants. Raleigh particularly emphasizes hexamethyldisilazane-treated silica and teaches that especially stable emulsions are formed.

Koerner et al., in U.S. Pat. No. 4,274,977, discloses a defoamer composition having a high dispersion stability composed of a water-insoluble defoamer oil, a water soluble emulsifier which is insoluble in the defoamer oil, and a mixture of a finely divided hydrophobic and hydrophilic silica. It is taught that the compositions allow for the production of exceptionally stable dispersions.

Keil, in U.S. Pat. No. 3,784,479, discloses foam control compositions which consist essentially of a base oil selected from polyoxypropylene polymers, polyoxypropylene-polyoxyethylene copolymers or siloxane-glycol copolymers, a foam control agent comprising a liquid dimethylpolysiloxane and silica filler, and a dispersing agent which consists of a copolymer of a siloxane resin and polyoxyalkylene polymer. The contribution to the art in this case is stated to be improved compatibility with otherwise desirable diluents without resorting to emulsifying the foam control agent in water.

In a closely related patent, Keil, in U.S. Pat. No. 3,984,347, discloses foam control compositions which consist essentially of a base oil selected from polyoxypropylene polymers, polyoxypropylene-polyoxyethylene copolymers or siloxane-glycol copolymers, a foam control agent comprising a liquid dimethylpolysiloxane and silica filler and a siloxane copolymer dispersing agent. This time the dispersing agent consists of a copolymer of a dimethylpolysiloxane polymer and a polyoxyalkylene polymer. The same advantages as reported for U.S. Pat. No. 3,784,479, cited supra, were obtained.

Japanese O.P.I. No. 139,107/81, published Oct. 30, 1981, teaches a self-emulsifying type defoaming agent which is said to have excellent foam-suppressing and breaking capability regardless of temperature and pH of a liquid to be treated and the storage period to which it is subjected. This agent is composed of a silicone copolymer having diorganosiloxane and organooxyalkylenesiloxane units in the copolymer chain.

Aizawa et al., in U.S. Pat. No. 4,639,489 and U.S. Pat. No. 4,749,740, the disclosures of which are hereby incorporated by reference, teach a method for producing a silicone defoamer composition wherein a complex mixture of polyorganosiloxanes, filler, a resinous siloxane and a catalyst to promote reaction of the other components are heated together at 50° C. to 300° C.

More recently, a method for preparing a composition similar to that described by Aizawa et al., cited supra, was disclosed in Australian Patent Application No. 75771/87, published on Jan. 21, 1988 and assigned to Dow Corning KK, the disclosure of which is hereby incorporated by reference. In this disclosure, the abovementioned complex silicone mixture additionally contains at least 0.2 weight parts of an organic compound having at least one group selected from COR, —COOR' or —(OR")$_n$—, wherein R and R' are hydrogen or a monovalent hydrocarbon group, R" is a divalent hydrocarbon group having 2 to 6 carbon atoms and the average value of n is greater than one. In this disclosure the inventor, T. Miura, emphasizes the need to react all the ingredients, including a catalyst, at elevated temperature to obtain the desired antifoam agent.

John et al., in European Patent Application No. 217,501, published Apr. 8, 1987, the disclosure of which is hereby incorporated by reference, discloses a foam control composition which gives improved performance in high foaming detergent compositions which comprises (A) a liquid siloxane having a viscosity at 25° C. of at least $7 \times 10^{-3}$ m$^2$/s and which was obtained by mixing and heating a triorganosiloxane-endblocked polydiorganosiloxane, a polydiorganosiloxane having at least one terminal silanol group and an organosiloxane resin, comprising monovalent and tetravalent siloxy units and having at least one silanol group per molecule, and (B) a finely divided filler having its surface made hydrophobic. John et al. further describes a method for making the foam control compositions and detergent compositions containing said foam control compositions.

Starch, in U.S. Pat. No. 4,983,316 discloses a dispersible antifoam composition for providing controlled foaming liquid laundry detergent formulations and wherein there is provided a non-aqueous emulsion of primary and secondary silicone antifoam agents, at least one nonionic silicone surfactant for emulsifying the primary and secondary antifoaming agents in a solvent, a first organic surfactant dispersing agent for assisting in dispersing the emulsified primary and secondary antifoaming agents in the liquid laundry detergents, and a second dispersing agent of a nonionic difunctional block-copolymer terminating in primary hydroxyl groups for further assisting in dispersing the emulsified primary and secondary antifoam agents in the liquid laundry detergent. A liquid laundry detergent composition containing the composition described immediately above is also disclosed.

McGee et al., in European Patent Application No. 341,952, published Nov. 15, 1989 discloses a combination of the above mentioned compositions of Aizawa et al. with particular silicone glycol compounds to provide improved antifoams for use in high pH aqueous systems, particularly pulp mill liquors. McGee et al. further describes that addition of a silica filler has been found to impart increased stability to the compositions and to dispersions thereof.

Hill et al., in European Patent Application No. 499,364, published Aug. 19, 1992 teaches a method of foam control wherein the antifoam agent is an emulsion gelled silicone composition prepared by first dispersing a curable liquid organopolysiloxane composition in a liquid continuous phase to form an emulsion and then curing the liquid silicone organopolysiloxane in-situ to a gelled state. Hill et al. further discloses that the compositions of the invention find particular utility in the control of foam in aqueous detergent systems.

Difficulties are encountered in delivering silicone antifoams to highly concentrated surfactant media. Approaches discussed by Keil and by Starch hereinabove suggest that any polyglycol can be used, however it has been discovered that, for some applications, solubility limitations can greatly hamper the effective dispersion of silicone antifoam compounds. Careful selection of the continuous phase may provide improved dispersibility of the antifoam compound, thus obviating the need for many of the dispersion aids present in Starch and simplifying the formulas for the emulsion.

In addition, no suggestion in the references above was made of the stability of the antifoam after it was delivered to the detergent medium. The present invention centers on the discovery that, by inclusion of filler materials in the antifoam compound, there is a large improvement in stability due to less sedimentation in liquid detergent concentrates that have specific gravities greater than 1.000, and that certain types of particulate materials can greatly increase antifoam droplet stability against aggregation during storage.

More importantly the present invention offers a very dramatic improvement in stability against coalescence and aggregation in concentrated detergent liquids. In reducing aggregation, the present invention can improve the uniformity of dispersion of the antifoam, provide more uniform and reproducible foam control delivery, and avoid the formation of unsightly lumps of aggregated antifoam droplets that may tend to sink or float during storage thus aiding in their stability and providing a far less visible form of the antifoam allowing for the formulation of transparent liquids if needed. Therefore, improved foam control can be obtained if compositions such as those described in Aizawa et al. are modified to offer improved combinations of antifoam compositions, non-aqueous phases, additonal fillers, and especially through the use of particulate stabilizers.

SUMMARY OF THE INVENTION

In accordance with the present invention, it has been discovered that a non-aqueous liquid continuous phase and a moderately hydrophobic particulate stabilizing aid when combined with and incorporated into an antifoam formulation of U.S. Pat. Nos. 4,639,489, 4,749,740, or EP0217501 cited supra, render the antifoam dispersible and stable in aqueous media such as liquid detergents, and especially concentrated liquid detergents, and therefore solve the problem of dispersibility of previously disclosed antifoam formulations. Thus the present invention relates to compositions consisting essentially of: (I) a reaction product prepared by reacting at a temperature of 50° C. to 300° C.: (i) 100 parts by weight of at least one polyorganosiloxane selected from the group consisting of (A) a polyorganosiloxane having a viscosity of about 20 to 100,000 cS at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of 1.9 to 2.2 and (B) a polyorganosiloxane having a viscosity of 200 to about 100 million cS at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —OR$^3$ group in each molecule, at least one such —OR$^3$ group being present at the end of the molecular chain, (ii) 0.5 to 20 parts by weight of at least one silicon compound selected from the group consisting of (a) an organosilicon compound of the general formula $R^4_d SiX_{4-d}$ in which $R^4$ is a monovalent hydrocarbon group having 1 to 5 carbon atoms, X is selected from the group consisting of hydroxyl and a hydrolyzable group and d has an average value of one or less, (b) a partially hydrolyzed condensate of said compound (a), (c) a siloxane resin consisting essentially of $(CH_3)_3 SiO_{1/2}$ units and $SiO_{4/2}$ units wherein the ratio of $(CH_3)_3 SiO_{1/2}$ units to $SiO_{4/2}$ units is 0.4:1 to 1.2:1, and (d) a condensate of said compound (c) with said compound (a) or (b), (iii) 0 parts by weight or an amount greater than 0 to 30 parts by weight of at least one finely divided filler, and (iv) a catalytic amount of a compound for promoting the reaction of components (i) to (iii), (II) a nonaqueous liquid continuous phase, and (III)

a moderately hydrophobic particulate stabilizing aid. It is therefore an object of the present invention to provide an easily dispersible silicone antifoam composition for use in a liquid detergent and wherein there is provided controlled foaming behavior.

It is another object of the present invention to provide a homogeneously dispersible silicone antifoam formulation for a liquid detergent or an aqueous medium wherein the antifoam composition can be dispersed into the liquid detergent or the aqueous medium in order to form stable, relatively uniform formulations having controlled foaming behavior.

Another object of this invention is to provide a dispersible silicone antifoam composition offering much improved stability against aggregation and separation and ease of dispersibility. It is also an object of this invention to greatly increase antifoam droplet stability against aggregation during storage in the highly concentrated liquid detergent medium. An additional object of this invention is to improve stability against coalescence and aggregation in concentrated detergent liquids. A further object of this invention is to improve the uniformity of dispersion of a silicone antifoam and avoid the formation of lumps of aggregated antifoam droplets that may tend to sink or float during storage.

These and other features, objects and advantages of the present invention will be apparent upon consideration of the following detailed description of the invention.

DETAILED DESCRIPTION OF THE INVENTION

The compositions of this invention consist essentially of (I) a reaction product prepared according to the disclosure of Aizawa et al., cited supra, (II) a nonaqueous liquid continuous phase, and (III) a moderately hydrophobic particulate stabilizing aid.

Component (I) of the present invention is a reaction product of (i) a polyorganosiloxane, (ii) a silicon compound, (iii) at least one finely divided filler and (iv) a catalytic amount of a compound for promoting the reaction of the other components.

Component (i) may be selected from (A) polyorganosiloxanes expressed by the general formula $R^1_a SiO_{(4-a)/2}$ and having a viscosity of 20 to 100,000 centistokes (cS) at 25° C. The organo groups $R^1$ of the polyorganosiloxane (A) are the same or different monovalent hydrocarbon or halogenated hydrocarbon groups having one to ten carbon atoms. Specific examples thereof are well known in the silicone industry and include methyl, ethyl, propyl, butyl, octyl, trifluoropropyl, phenyl, 2-phenylethyl and vinyl groups. The methyl group is particularly preferred. In the above formula, a has a value of 1.9 to 2.2. It is particularly preferred that polyorganosiloxane (A) is a trimethylsilyl-terminated polydimethylsiloxane having a viscosity of about 350 to 15,000 cS at 25° C.

Alternatively, component (i) may be selected from (B) polyorganosiloxanes expressed by the general formula $R^2_b (R^3O)_c SiO_{(4-b-c)/2}$ and having a viscosity of 200 to 100 million centistokes at 25° C. wherein $R^2$ is independently selected from the monovalent hydrocarbon or halogenated hydrocarbon groups designated for group $R^1$, $R^3$ is a hydrogen atom or $R^2$, and the —$OR^3$ group is present at least at one end of the molecular chain of the polyorganosiloxane. The value of b is between 1.9 to 2.2 and c is has a value so as to provide at least one —$OR^3$ group per molecule. It is particularly preferred that polyorganosiloxane (B) is a hydroxyl-terminated polydimethylsiloxane having a viscosity of about 1,000 to 50,000 cS at 25° C. Component (i) may also be a mixture of (A) and (B) in any proportion.

Component (ii) is at least one silicon compound selected from (a) to (d), (a) an organosilicon compound of the general formula $R^4_d SiX_{4-d}$ wherein $R^4$ is a monovalent hydrocarbon group having one to five carbon atoms, X is a hydrolyzable group, such as —$OR^5$ or —$OR^6OR^7$, in which $R^6$ is a divalent hydrocarbon group having one to five carbon atoms and $R^5$ and $R^7$ are each hydrogen or a monovalent hydrocarbon group having one to five carbon atoms, the average value of d not exceeding 1; (b) a partially hydrolyzed condensate of the compound (a); (c) a siloxane resin consisting essentially of $(CH_3)_3SiO_{1/2}$ and $SiO_2$ units and having a $(CH_3)_3SiO_{1/2}/SiO_2$ ratio of 0.4/1 to 1.2/1; and (d) a condensate of the siloxane resin (c) with the compound (a) or (b).

It is preferred that component (ii) is selected from either an alkyl polysilicate wherein the alkyl group has one to five carbon atoms, such as methyl polysilicate, ethyl polysilicate and propyl polysilicate, or the siloxane resin (c). Most preferably, component (ii) is either ethyl polysilicate or a siloxane resin copolymer consisting essentially of $(CH_3)_3SiO_{1/2}$ units and $SiO_2$ units in a molar ratio of 0.4:1 to 1.2:1.

Component (iii) is optional and is at least one finely divided filler such as fumed $TiO_2$, $Al_2O_3$, $Al_2O_3/SiO_2$, $ZrO_2/SiO_2$ and $SiO_2$. Silica ($SiO_2$) can be produced by a dry method such as the thermal decomposition of a silicon halide or the reaction of a substance containing silicic acid under heat, or silica can be produced by a wet method such as the decomposition of a metal salt of silicic acid, e.g., sodium silicate, by an acid or the aerogel method. Various grades of silica having a particle size of several millimicrons to several microns and a specific surface area of about 50 to 500 m²/g are commercially available and suitable for use as component (iii). Preferably, the filler is selected from silicas having a surface area of about 50 to 300 m²/g. Fumed $TiO_2$, $Al_2O_3$, and $Al_2O_3/SiO_2$ can be prepared by the well-known process of burning $TiCl_4$, $AlCl_3$, and $SiCl_4$ and mixtures thereof. Specific examples of this filler include zirconium silica hydrogels, and hydrophilic or hydrophobic silica. For purposes of the present invention the term "finely divided filler" excludes materials such as mined quartz or micronized quartz.

Preferably the finely divided filler is a compatiblized filler such as hydrophobically modified finely divided silica which has been modified by surface reaction with any of the various treating agents to produce a well treated, hydrophobic surface. This can be accomplished in-situ or by prior treatment. Component (iii) can be 0 parts by weight in Reaction Product (I) or can be from greater than zero to 30 parts by weight per 100 parts by weight of Reaction Product (I).

Component (iv) is a compound used as a catalyst for promoting the reaction of the other components. It is preferably selected from siloxane equilibration and/or silanol-condensing catalysts such as alkali metal hydroxides, alkali metal silanolates, alkali metal alkoxides, quaternary ammonium hydroxides and silanolates, quaternary phosphonium hydroxides and silanolates and metal salts of organic acids. It is preferred that the catalyst is potassium silanolate.

For the purposes of the present invention, the reaction product may optionally contain component (v), a polyorganosiloxane expressed by the general formula $R^8_e(R^9O)_f SiO_{(4-e-f)/2}$ and having a viscosity of 5 to 200 cS at 25° C. wherein $R^8$ is a monovalent hydrocarbon or halogenated hydrocarbon group having one to ten carbon atoms and $R^9$ is hydrogen or a monovalent hydrocarbon group having one to ten carbon atoms. The value of e is between 1.9 and 2.2 and f has a value so as to provide two or more —$OR^9$ groups in each molecule. It is particularly preferred that component (v) is a hydroxyl-terminated polydimethylsiloxane having a viscosity of about 10 to 50 cS at 25° C. It is preferred that component (v) is added when filler (iii) is a hydrophilic silica.

A mixture of components (i) to (iv), optionally containing component (v), is reacted under heat to produce the reaction product, the proportions of the various components being:

Component (i)—100 parts by weight;

Component (ii)—0.5 to 20, preferably 1 to 7, parts by weight;

Component (iii)—0 parts by weight, or from greater than 0 to 30, preferably 1 to 15, and highly preferred is 5 to 15 parts by weight;

Component (iv)—A catalytic amount (usually in the range of 0.03 to 1 part by weight);

Component (v)—0 to 20, preferably 1 to 10, parts by weight.

The proportions of components (A) and (B) used depends largely on their respective viscosities. It is preferable to use a mixture of (A) and (B) which has a viscosity of 1,000 to 100,000 cS at 25° C.

The reaction product (I) is prepared by first mixing components (i) and (ii) and heating this blend to about 110 to 120° C. and then adding catalyst (iv). Finely divided filler (iii), if desired, is then uniformly mixed in using an appropriate dispersing device, such as a homomixer, colloid mill or triple roll mill. The resulting mixture is heated at a temperature of 50° C. to 300° C., preferably 100° C. to 300° C., and reacted for one to eight hours, although the reaction time varies depending on the temperature. If component (v) is to be employed in the composition, it is generally added after the filler (iii). It is preferable to carry out all mixing and heating operations in an inert gas atmosphere in order to avoid any danger and to remove volatile matter (unreacted matter, by-products, etc.). The mixing order of the components and the heating temperature and time as hereinabove stated are not believed critical, but can be changed as required. It is further preferred that, after reaction, the catalyst is neutralized to further stabilize reaction product (I). Alternatively, reaction product (I) preferably comprises a diorganopolysiloxane and a silicon compound, this combination optionally containing a filler such as silica. These systems contain a mixture of a trimethylsilyl-terminated polydimethylsiloxane and a diorganopolysiloxane having silicon-bonded hydroxyl groups or silicon-bonded alkoxy groups along its main chain or at its chain ends, said alkoxy groups having from 1 to 6 carbon atoms. The silicon compound (ii) acts as a crosslinker for the diorganopolysiloxane by reacting with the functionality of the latter. It is further preferred that the above diorganopolysiloxane is either a linear or a branched polymer or copolymer of siloxane units selected from dimethylsiloxane units, methylphenylsiloxane units or methyltrifluoropropylsiloxane units. Most preferably, the diorganopolysiloxane of component (A) is a polydimethylsiloxane containing Si-bonded hydroxyl or methoxy functionality. The above mentioned silicon compound (ii) is preferably a siloxane resin consisting essentially of $(CH_3)_3SiO_{1/2}$ and $SiO_2$ units and having a molar ratio of $(CH_3)_3SiO_{1/2}/SiO_2$ between 0.4:1 and 1.2:1. The latter resin may be prepared according to methods taught in, e.g., U.S. Pat. No. 2,676,182 to Daudt et al. and typically contains from about 0.5 to about 3 weight percent of hydroxyl groups.

A highly preferred component (I) is a homogeneous blend of a hydroxyl-terminated polydimethylsiloxane and a a trimethylsilyl-terminated polydimethylsiloxane having a viscosity in the range of about 1,000 to 50,000 cS at 25° C., a siloxane resin having a molar ratio of $(CH_3)_3SiO_{1/2}/SiO_2$ units of from 0.4:1 to 1.2:1, and a potassium silanolate catalyst reacted at a temperature of 50 to 300° C.

The nonaqueous liquid continuous phase (II) of the present invention may be a non-reactive organic composition. The term "non-reactive" is intended to convey the restriction that this component be generally compatible with the silicone antifoam (I), as detailed above. Since component (II) is designed to be a distinct phase, its character is further restricted to liquids which are essentially immiscible with the particular silicone antifoam (I). The nonaqueous liquid continuous phase of component (II) can be selected from the group consisting of ethylene glycol, propylene glycol, polypropylene glycol, polyethylene glycol, copolymers of either a random or block type of propylene and ethylene glycols, and condensates with polyols such as glycerol. Additional nonaqueous liquid phases of this invention include a wide range of nonionic organic surfactants such as alcohol alkoxylates or alkylphenol alkoxylates.

The nonaqueous phase is selected for ease of dispersibility and solubility in the liquid detergent medium since insufficient solubility can lead to poor stability and poor performance of the antifoam in the liquid detergent. Consideration is also made for compatibility of the liquid with the nonionic silicone surfactants which may be used in preparing the antifoam emulsion described hereinbelow. The liquids are further selected based on their specific gravity with a close match relative to the antifoam particles being preferable. Preferably, component (II) has a viscosity below about 10,000 cS at 25° C. A closer match of the continuous phase specific gravity to the antifoam droplets may be obtained by judiciously selecting and blending two or more nonaqueous liquids to make component (II). It is preferable that about 25 to 900 parts by weight of liquid continuous phase (II) be used per 100 parts by weight of defoamer reaction product (I). It is highly preferred for purposes of the present invention that 100 to 400 parts by weight of liquid continuous phase (II) be used per 100 parts by weight of defoamer reaction product (I).

Component (III) of the present invention is a moderately hydrophobic particulate stabilizing aid wherein the particulate is a very fine particle size silica. Typically component (III) of the present invention is silica and is of the fumed or precipitated types but not limited to this type, having a B.E.T. surface area preferably from 50 to 500 square meters per gram, the surface of which has been incompletely treated with hydrophobing agents.

One important measure of the hydrophobing treatment level is the analysis of bound carbon on the silica. The majority of hydrophobing agents used today incorporate carbon as a critical component of their hydrophobic groups and as such carbon contributes directly to the hydrophobic layer on the silica surface. We have discovered that in comparing silicas of different surface areas it is necessary to normalize the amount of bound carbon with respect to the total surface area of the treated silica, as measured by the nitrogen B.E.T. technique to obtain a valid comparison. For purposes of the present invention the term "Specific Loading" denotes the micrograms of carbon bound per square meter of surface area. The bound carbon may be measured by any of a number of analytical techniques but should be a concretely measured value. This comparison is expecially useful when the treatment agent and treatment conditions are the same among a series of samples to be evaluated based on their hydrophobicity. It is assumed for the purposes of such a comparison that the relative number of surface silanols is not affected by any other treatments such as roasting at elevated temperatures, etc., which would impact the hydrophilicity of untreated regions. It should be noted that the type of carbon deposited on the surface and its distribution on the surface will have a major impact on the level of hydrophobicity.

One measure of treatment level is determined by using the Methanol Wettability test. This is a standard test known in the industry which measures the volume percent of methanol in water needed to just wet the silica. Silicas that are wettable by solutions containing less methanol are more hydrophilic, those requiring more methanol are more hydrophobic.

For example, one embodiment of component (III) that has shown good utility in the present invention is Aerosil® R 972 (fumed silica that has been treated to a moderate level with dichlorodimethylsilane, having about 110 $m^2/g$ BET surface area, Degussa Corporation, Ridgefield Park, N.J.). This material is prepared from a fumed silica having surface area of 130 $m^2/g$. The silica is treated with dimethyldichlorosilane at about 500° C. with the treating level being controlled to provide less than complete methylation of the surface. In the case of Aerosil® R 972 it is estimated that 70% of the surface hydroxyl groups present on the original silica have been methylated leaving approximately 30% untreated. Thus this silica has a 70/30 or a 2.33 treated/untreated silanol ratio. The specific loading for this silica is 91 micrograms ($\mu g$) of bound carbon per square meter based on the analysis of about 1.0 weight percent bound carbon (0.01 g Carbon/g Silica) and 110 $m^2/g$ of the treated silica.

The untreated hydroxyls are hydrophilic and are capable of hydrogen bonding with polar substances such as water. The alkylated portion of the surface is non-polar in nature and hydrophobic. A controlled level of treatment will provide a moderately treated silica with a balance between the hydrophobic alkylated surface and the hydrophilic untreated surface. Particulates having a controlled level of hydrophobic treatment prior to utilization are preferred as component (III) in the present invention.

Any of several known treating methods may be employed in prior treatment of the silica for component (III). For example in a preferred embodyment fumed silica can be treated with dimethyldichlorosilane to affix dimethylsilane groups on the surface of the silica. The hydrophobing agents herein are any of those well known to the art which provide organosilyl reaction products bound to the silica surface. Common examples of hydrophobing agents are silanes, siloxanes, or silazanes. Thus, modification is carried out by procedures well known to the art, for example, by reaction of the silica surface with trialkylchlorosilane, dialkyldichlorosilane, octaalkylcyclotetrasiloxane, or hexaalkyldisilazane, or hexaalkyltrisilazane under suitable conditions. Hydrophobing agents such as polydimethylsiloxane are not preferred for this invention unless special care is taken to limit the amount of hydrophobic material placed on the silica surface and its distribution.

It is preferred that for the compositions of the present invention that the stabilizing aid of component (III) be a silica whose surface has been hydrophobically modified to provide a surface composition having a treated/untreated surface silanol ratio such that it has a Methanol Wettability of from 20 to 70 percent. It is highly preferred in the present invention that component (III) have a Methanol Wettability of from 35 to 55 percent.

Other characteristics of the silica of component (III) are hypothesized to have influencing factors on their relative utility as stabilizing aids. Without limiting the present invention to any particular theory, it is believed that the physical and chemical makeup of the solid's surface is important to the utility of the particulates in the present invention in that it controls the wetting behavior of the solid. Thus, in addition to having a controlled level of surface treatment, the uniformity of distribution of the hydrophobic materials on the surface and the surface roughness and porosity of the solid is thought to impact wetting behavior, especially wetting hysteresis.

The manner in which the particulates are assembled is also thought to influence their utility. For example, silicas are thought to consist of primary particles linked together into aggregates which are assembled into agglomerates through physical interactions. Breakup of agglomerates into smaller particles may be one component in the relative efficiency of the particulate stabilization and should be a component of processing optimization.

An effective amount of the stabilizing aid of the present invention is required for the compositions of the present invention to display beneficial effects in liquid detergent systems. However, it is preferable that about 0.1 to 250 parts by weight of stabilizing aid be used per 100 parts by weight of defoamer reaction product (I). It is highly preferred for purposes of the present invention that 0.3 to 125 parts by weight of stabilizing aid be used per 100 parts by weight of defoamer reaction product (I).

Optionally the compositions of the present invention additionally comprise (IV) at least one nonionic silicone surfactant. The nonionic silicone surfactant is preferably a material including a trimethylsilyl endcapped polysilicate which has been condensed with a polyalkylene glycol or diester in a solvent, or a block copolymer of polydimethylsiloxane and polyalkylene oxide. Typically a sufficient quantity of at least one nonionic silicone surfactant is employed to aid emulsification of silicone antifoam component (I) described hereinabove in the nonaqueous liquid continuous phase component (II) described hereinabove. Generally, from about 1 to 40 parts by weight of surfactant is used for each 100 parts by weight of component (I). These surfactants are well known in the art and are exemplified by the "dispersing agents" disclosed by Keil in U.S. Pat. Nos. 3,784,479 and 3,984,347, the disclosures of which are hereby incorporated by reference to teach said surfactants. In some instances the surfactants may best be processed from a solvent such as a polyalkylene glycol or copolymers thereof, cyclic silicones, or an organic solvent such as xylene.

The compositions of the present invention may also additionally comprise (V) a level of a nonreinforcing inorganic filler mixed internally to component (I) to increase its density to match the density of component (II) or of the liquid detergent, thus reducing the rate of settling of antifoam particles in the liquid medium. Preferably the nonreinforcing inorganic filler is added to component (I) after the reaction is complete as it is cooling.

A wide variety of materials may be used as an inorganic filler. Specific examples of these materials are ground, micronized, or seived inorganic compounds or minerals either naturally occurring or artificial. One requirement is that the particle size be small relative to the antifoam droplets to provide for more uniform density distribution between droplets. To attain high densities needed for maximum efficiency, very dense or crystalline materials may be preferred.

Preferred as the nonreinforcing inorganic filler (V) for the compositions of present invention are Min-u-sil® ground crystalline silicas (available from U.S. Silica Company, Berkeley Springs, W. Va.), microcystalline novaculite such as Novacite® or surface modified forms such as Novakup® (Malvern Minerals Company Hot Springs National Park, Ark.), calcium carbonate, antimony oxides, wollastonite, titanium oxides or their surface modified forms available commercially as Carbokup®, Monykup®, Wollastokup®, or Trikup®, (Malvern Minerals Company, Hot Springs National Park, Ark.). In addition, diatomaceous earth, clays, zinc oxides such as Azo 77 or Azo 77TT from Asarco Inc. (Hillsboro, Ill.) or Barium sulfate such as 2278 Blanc Fixe or 106 Lo Micron White Barytes S.F. from Wittaker Clark and Daniels Inc. (South Plainfield, N.J.) may be used as inorganic filler (V) in the compositions of the present invention however this list is not exhaustive.

Alternatively, higher levels of finely divided filler (iii) described hereinabove normally used in antifoams, may be used at levels higher than necessary just for antifoaming efficacy, reducing or obviating the need for an additional nonreinforcing filler. An additional advantage in clarity or appearance of the defoaming component may be realized. This approach may be limited by any loss in antifoam efficacy due to overloading of the reaction product compound. Another limiting factor in this approach is that addition of large amounts of these materials will increase the viscosity of the defoaming component (I) and may hinder processing, emulsification, and/or performance of the antifoam.

In addition to the above mentioned components, the foam control agents of the present invention may also contain adjuvants such as corrosion inhibitors and dyes.

The compositions of the present invention may be prepared by homogeneously mixing, without heating or further catalysis, components (I), (II), and (III) and any optional components, using any suitable mixing means such as a spatula, mechanical stirrers, in-line mixing systems containing baffles, blades, or any of the like mixing surfaces including powered in-line mixers or homogenizers, a drum roller, a three-roll mill, a sigma blade mixer, a bread dough mixer, and a two roll mill.

The order of mixing components (I) to (III) is not critical, however it is highly preferred that components (I) and (III) not be premixed together. After component (I) and nonaqueous liquid continuous phase (II) are mixed, component (III) is combined with the mixture of components (I) and (II) to form an emulsion and to form a composition of the present invention. The particulate stabilizing aid (III) may be combined with the mixture of (I) and (II) either as a dry powder or as a premix in a portion of component (II).

The method described hereinabove is not limiting however. Another method for preparing the compositions of the present invention involves mixing components (II) and (III) together, and next combining component (I) with the mixture formed by (II) and (III). It is preferred that the stabilizing aid component (III) not be mixed into the silicone antifoam component (I) directly as this may cause the stabilizing aid to lose its hydrophilic character and thus reduce the effectiveness of the compositions of the invention.

The present invention further relates to a composition prepared by mixing (I) a reaction product, (II) a nonaqueous liquid continuous phase, and (III) an effective amount of a particulate stabilizing aid, with the proviso that components (I) and (III) are not mixed together without the presence of component (II). In this aspect of the invention the reaction product, nonaqueous liquid continuous phase, and particulate stabilizing aid are as delineated above including preferred embodiments thereof. The amounts are also as stated hereinabove.

Optional component (IV), i.e. at least one nonionic silicone surfactant, may be added separately to Component (I), (II), or (III), or to any combination of components (I), (II), or (III), or to the final emulsion of (I), (II), and (III). Preferably optional Component (V), the nonreinforcing inorganic filler, is added to component (I) after the reaction is complete as it is cooling.

The present invention also relates to a method of making a silicone antifoam comprising the steps of mixing (I) a reaction product, (II) a nonaqueous liquid continuous phase, and (III) a moderately hydrophobic particulate stabilizing aid, with the proviso that components (I) and (III) are not mixed together without the presence of component (II). In the method of the present invention, components (I), (II), and (III) are as delineated above including preferred embodiments thereof. The amounts are also as stated hereinabove.

Again, optional component (IV), i.e. at least one nonionic silicone surfactant, may be added separately to Component (I), (II), or (III), or to any combination of components (I), (II), or (III), or to the final emulsion of (I), (II), and (III). Preferably, optional component (V), the nonreinforcing inorganic filler, is added to component (I) after the reaction is complete as it is cooling.

Antifoam compositions prepared in accordance with the present invention were prepared and tested in order to demonstrate their defoaming capabilities and to determine stability and performance of the antifoam compositions.

The compositions of the present invention were tested in a concentrated liquid detergent. Concentrated liquid detergents are made up of a combination of ingredients (such as those described in Surfactants in Consumer Products, Theory, Technology, and Application, J. Falbe, Springer-Verlag, Heidelberg, 1987 and in Detergents and Textile Washing, G. Jakobi and A. Lohr, VCH, New York, N.Y., 1987): including anionic surfactants, typically of the organic sulfate or organic sulfonate types, and/or nonionic surfactants, many types of which are known to the art, optionally in combination with fatty acid soaps, many blends of which are in current use; builder-buffers: such as sodium citrate, sodium tripolyphosphate, and organic amine neutralizing agents; surfactant solubilizing agents: including solvents such as propylene glycol, ethanol, or other alcohols and water, and hydrotropes such as sulfonates of aromatic or polyaromatic organic compounds; and other ingredients: such as enzymes, enzyme stabilizers, soil suspending agents, optical brighteners, perfumes, dyes, opacifiers, fragrances, and many other optional ingredients known to the art. A wide range of prior art teaches about liquid laundry and liquid detergent formulas such as the general descriptions given by Crutzen in U.S. Pat. No. 4,507,219. An excellent description of the nonionic surfactants normally used and the optional ingredients present in heavy duty liquid laundry detergents is offered by Barrat et al. in U.S. Pat. No. 4,285,841. More recently, highly concentrated heavy duty liquid detergents containing from 10 to about 24 wt. % water have been described, for example, Kennedy in U.S. Pat. No. 4,973,416. This listing of prior art is not meant to be complete in any way, nor is it limiting, but is meant to generally describe the area.

In the examples, the compositions of the present invention and the comparative compositions were tested for Collar, Aggregation, and Stability. Collar denotes the thickness of the antifoam layer collected on top of the liquid detergent around the perimeter of the bottle. Aggregation denotes the collection of individual antifoam droplets into flocculates or clumps that are visible by the human eye and suspended in the body of the liquid. Stability denotes an overall description of the emulsion stability against association with the bottle walls and the uniformity of emulsion distribution in the sample.

EXAMPLES

The following examples are presented to further illustrate the method and compositions of this invention, but are not to be construed as limiting the invention, which is delineated in the appended claims. All parts and percentages in the examples are on a weight basis and all measurements were made at 25° C. unless indicated to the contrary.

The following materials, listed for ease of reference, were employed in the preparation of the antifoam compositions:

POLYORGANOSILOXANE A is a trimethylsilyl endblocked polydimethylsiloxane having a viscosity of 1,000 Cs at 25° C.

POLYORGANOSILOXANE B is a hydroxyl-terminated polydimethylsiloxane having a viscosity of approximately 13,500 cS at 25° C.

CONTINUOUS PHASE I is P15-200® which is an ethylene oxide/propylene oxide triol copolymer with glycerin having a molecular weight of about 2,600 from Dow Chemical Company (Midland, Mich.).

CONTINUOUS PHASE II is NEODOL® 25-7, an organic alcohol ethoxylate from Shell Chemical Chemical Company, (Houston, Tex.).

CONTINUOUS PHASE III is PEG 300, a polyethylene glycol having an average molecular weight of 300 from the Dow Chemical Company, (Midland, Mich.).

CATALYST I=A mixture of 90 g of isopropyl alcohol and 10 g of KOH mixed at 80° C. for 20 minutes.

RESIN I=A 70% xylene solution of a hydroxy-functional siloxane resin copolymer consisting essentially of $(CH_3)_3SiO_{1/2}$ and $SiO_2$ units having a $(CH_3)_3SiO_{1/2}/SiO_2$ ratio of about 0.75:1.

FINELY DIVIDED FILLER I is SIPERNAT® D10 is a hydrophobic silica from Degussa Corp (Ridgefield Park, N.J.).

FINELY DIVIDED FILLER II is QUSO® WR 55 is a hydrophobic precipitated silica from Degussa Corporation (Ridgefield Park, N.J.).

STABILIZING AID I is AEROSIL® R 972 a fumed silica that has been treated to a moderate level with dichlorodimethylsilane, having about 110 m²/g BET surface area, having a methanol wettability of about 45% and is from Degussa Corp. (Ridgefield Park, N.J.).

NONREINFORCING FILLER I is MIN-U-SIL® QUARTZ a micronized quartz having the majority of its particles smaller than 5 microns sold under the trade name Min-u-sil 5 by U.S. Silica Company (Berekely Springs, W. Va.).

P 4000 is a polypropylene glycol of about 4000 molecular weight from Dow Chemical Company (Midland, Mich.).

TRITON X-100 is an octylephenolxyethoxy(10)ethanol nonionic surfactant having an HLB of 13.5 and from Rohm and Hass, (Philadelphia, Pa.).

PLURONIC L-101 is a block coplymer surfactant of ethylene oxide and propylene oxide having an HLB of 1 from BASF, (Parsippany, N.J.).

SURFACTANT 1=A nonionic silicone surfactant of trimethylsilyl endcapped polysilicate prepared according to methods described by Keil in U.S. Pat. No. 3,784,479. A mixture of 7 parts of RESIN I (supra), 15 parts of a copolymer of ethylene oxide and propylene oxide having a molecular weight of about 4,000, and 38 parts of xylene was reacted at reflux for 8 hours with 0.2 part of a stannous octoate, 0.1 parts of phosphoric acid was added and the product was blended with 40 parts of a polyethylene glycol-polypropylene glycol copolymer. The product was stripped at 40 mm Hg at 140° C. to remove xylene and filtered.

SURFACTANTS 2–5 are block copolymers of polydimethylsiloxane and polyalkylene oxide having the average structure, shown below, were used alone or as present in a solvent:

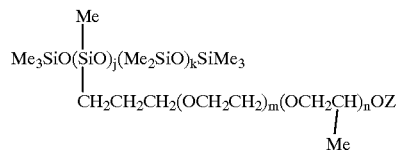

wherein Me denotes methyl radical, and and the values of j, k, m, n, are shown in Table I hereinbelow.

TABLE I

| Surfactant Number | k | j | m | n | Z | Solvent |
|---|---|---|---|---|---|---|
| 2 | 103 | 9.5 | 18 | 18 | —C(O)CH₃ | neat |
| 3 | 22 | 2 | 12 | 0 | —C(O)CH₃ | neat |
| 4 | 396 | 4 | 18 | 18 | —H | cyclic diorgano polysiloxane |
| 5 | 22 | 2 | 12 | 0 | —C(O)CH₃ | |

SURFACTANT 6=A nonionic silicone surfactant of trimethylsilyl endcapped polysilicate prepared according to the method described by Keil in U.S. Pat. No. 3,784,479. A mixture of 12 parts of RESIN I, 22 parts of a polypropyleneoxide condensate with glycerol having a molecular weight of 3,500 to 4,000, and 35 parts of xylene was reacted at 135–140° C. for 4 hours with 0.17 parts of stannous octoate. About 0.1 parts of phosphoric acid was added and the product was stripped of solvent, cooled and then blended with 31 parts of a polypropylene glycol having a molecular weight of about 2,000, whereupon remaining volatiles were flashed off at 40 mm Hg at 140° C.

REACTION PRODUCT 1=A reaction product was prepared according to the method of John et al. as described in EP 0 217 501, by mixing 64.3 parts of POLYORGANOSILOXANE A and 3.43 parts of RESIN I under nitrogen and then stripping at 180° C. at 80 millibar pressure for 2 hours. The mixture was cooled to 80° C. and 32 parts of POLYORGANOSILOXANE B and 0.16 parts of CATALYST I were added with stirring. The mixture was maintained at 80° C. under vacuum (80 millibar) for about 5 hours. 0.009 parts of glacial acetic acid and 0.11 parts of water were added with stirring. 5.27 parts of FINELY DIVIDED FILLER I were added with stirring and the product was allowed to cool.

REACTION PRODUCT 2=A reaction product was prepared according to the method of Aizawa U.S. Pat. No.

4,639,489 cited supra. This antifoam contained 60 parts of POLYORGANOSILOXANE A; 29 parts of POLYORGANOSILOXANE B; 2.9 parts of ethyl polysilicate ("silicate 45" of Tama Kagaku Kogyo Co., Ltd., Japan); 4.8 parts of a potassium silanolate catalyst; 2.9 parts of Aerogel #200 Silica (Nippon Aerogel Co., Japan) having a surface area of 200 $m^2/g$; and 4.8 parts of hydroxy-terminated polydimethylsiloxane having a viscosity of 40 cS. In addition to the above ingredients, this formulation also included 0.3 parts of ethanol as part of the catalyst, 0.1 part of water adsorbed on the silica and 0.1 part of L-540 (from Union Carbide, Danbury, Conn.) was added. After the reaction was complete the reaction was stopped by the addition of carbon dioxide.

REACTION PRODUCT 3=A reaction product produced by the exact method described above for REACTION PRODUCT 1 but using 10.66 parts of FINELY DIVIDED FILLER I.

REACTION PRODUCT 4=A reaction product produced by the exact method described above for REACTION PRODUCT 2 but with the addition of 10.5 parts of FINELY DIVIDED FILLER II for every 100 parts of silicone reaction product and was added with mixing just prior the final cooling of the reaction product.

CONCENTRATED LIQUID DETERGENT 1=a highly concentrated liquid detergent.

Test Method 1

Each sample was contained in a plastic bottle which was then subjected to a thermal gradient produced when they were placed on a warm metal surface, such as the top of a thermostatic oven or a warm water bath. The metal surface was maintained at approximately 55° C. which warmed the bottom of the sample. Air was free to circulate which cooled the top of the samples creating a thermal gradient from bottom to top in the sample. This gradient promoted circulation within the sample and was found to quickly promote antifoam aggregation.

Test Method 2

Each sample was contained in a plastic bottle and the bottles were placed in a oven thermostatically controlled to 49° C.

Example 1

A demonstration of the utility of the present invention was conducted in this example. To 447.45 parts of REACTION PRODUCT 1 was added 52.55 parts of NONREINFORCING FILLER I. The quartz was first blended in by hand and then mixed under high shear supplied using a Greerco mixer-homogenizer (model IL 1989) for ½ hour, cooled to room temperature, and homogenized for a second ½ hour. The quartz must be fully blended into the silicone and was preferably given additional time to become fully wetted by the silicone antifoam. Typically our mixtures containing quartz showed optimum performance when quartz was in contact with the fluid for more than one day at room temperature.

A non-aqueous emulsion was prepared by adding 600 parts of the above modified antifoam compound to a combination of 150 parts of SURFACTANT 1 with 810 parts of CONTINUOUS PHASE I. Stirring was supplied from a Lightin'® LabMaster II™. mixer fitted with two airplane style stirring blades operating at 500 RPM. After about 5 hours, stirring was ceased and a particle size measurement was performed showing a mean volume average particle size of 60 microns. This mixture is designated herein as ANTIFOAM EMULSION A.

A dramatic demonstration of the present invention was made in the following manner. A 1% mixture of Antifoam Emulsion A was made in CONCENTRATED LIQUID DETERGENT 1 by thoroughly dispersing the emulsion into the CONCENTRATED LIQUID DETERGENT with hand stirring and designated SAMPLE 1. SAMPLE 2 was made in a similar manner but 0.1 wt. % of STABILIZING AID I was dispersed into the CONCENTRATED LIQUID DETERGENT prior the addition of the antifoam emulsion. Both samples were placed into identical 2 oz. glass vials and were tested according to Method 1. Sample 1 was observed to have a medium level of flocculation after approximately 3 hours. Sample 2 was continuously monitored and only began to show flocculation obvious to the eye after 9 days.

Example 2

An illustration of the effect of the stabilizing aid in the compositions of the present invention was conducted in the following manner. A series of premixes were made with the silicas listed below. The premixes were prepared at 5.0 wt % by adding 10 parts of silica to 190 parts of CONTINUOUS PHASE I by sifting the dry silica powder into the liquid with stirring. The mixture was stirred for approximately 15 minutes at 400 RPM. All the powder was wetted and thoroughly mixed to produce a transparent thick liquid. The types of silica employed in this example are listed in Table II below. In Table II hereinbelow, PDMS denotes Polydimethylsiloxane, and HDMZ denotes Hexamethyldisilazane.

TABLE II

| SILICA | SURFACE AREA ($m^2/g$) | TREATMENT TYPE* | BOUND CARBON (Wt. %) | SPECIFIC LOADING ($\mu g\ C/m^2$) |
|---|---|---|---|---|
| 8 | 380 | NONE | 0 | 0 |
| 5 | 170 | $(CH_3)_2Cl_2Si$ | 1 | 59 |
| 1 | 120 | $(CH_3)_2Cl_2Si$ | 0.85 | 71 |
| 3 | 110 | $(CH_3)_2Cl_2Si$ | 1 | 92 |
| 2 | 200 | HMDZ | >3.4 | >175 |
| 4 | 90 | PDMS | 3 | 343 |
| 6 | 100 | PDMS | >4.5 | >471 |

These silicas were further characterized using a methanol wettability test (Determination of the Methanol Wettability of Hydrophobic Fumed Silicas by the Multipoint Method, Method number ACM-125 from Degussa Corporation, Ridgefield Park, N.J.) in which the silica samples are shaken into a series of solutions of increasing methanol content. The solution of water/methanol at which the silica was fully wetted was determined following centrifugation of the sample for 5 minutes at 2500 RPM with a 5.75 inch radius rotor. Plotting of the sediment height as a percent of the sediment height at complete wetting allows for a multipoint approach.

A series of samples were prepared using the silica premixes. The 5 wt. % silica premix was blended with Antifoam Emulsion A to provide 0.05 to 0.4 silica to antifoam ratio and then the mixture was blended in to CONCENTRATED LIQUID DETERGENT 1 at 2 wt. %. The samples were observed during Testing Method 1 and were ranked according to their performance in terms of aggregation stability in Table III below. The samples were ranked from 1 to 8, with 1 indicating the best stability versus aggregation. A description of the appearance of the samples at 190 Hrs. was recorded for each sample is also listed in Table III below. A sample containing no stabilizer was prepared by adding an additional amount of CONTINUOUS PHASE I in place of the silica premix.

TABLE III

| SILICA | METHANOL WETTABILITY MeOH vol % | RANK 14 HRS | RANK 48 HRS | RANK 61 HRS | RANK 190 HRS | 190 HOURS DESCRIPTION |
|---|---|---|---|---|---|---|
| 1 | 40 | 1 | 4 | 1 | 2 | small flocs uniformly dispersed good |
| 2 | 70 | 1 | 1 | 4 | 4 | 1 mm flocs uniformly dispersed |
| 3 | 45 | 1 | 1 | 3 | 1 | very good: uniform haze |
| 4 | 70 | 6 | 6 | 6 | 6 | compact 3–5 mm clumps |
| 5 | 50 | 1 | 1 | 1 | 3 | small flocs/haze good |
| 6 | 70 | 5 | 5 | 5 | 5 | 1–1.5 mm flocs |
| 8 | 10 | 7 | 7 | 7 | 7 | 10 mm flocculate with haze |
| NO STABILIZER | | 8 | 8 | 8 | 8 | 10 mm flocculated |

Example 3

An illustration of the ease of dispersibility of the compositions of the present invention in a liquid detergent was demonstrated in the following manner. 400 g of DEFOAMER REACTION PRODUCT 3 was blended with 100 g of SURFACTANT 1 to prepare Premix 3-1. Premix 3-2 was prepared by blending 100 g of STABILIZING AID I into 900 g of CONTINUOUS PHASE I and then mixed on the Greerco mixer-homogenizer for ½ hour. 250 g of Premix 3-1 was added to 25 g of Premix 3-2 with stirring by a mechanical mixer with two six-blade turbine agitators fixed on the shaft operating at 750 RPM for two hours and then 500 RPM for approximately 5 hours. This mixture was shown to have average particle size in the 20 to 100 micron range and was suitable for easy dispersion into detergent concentrates.

Example 4

Different methods of mixing the components of the present invention and different types of continuous phases were illustrated in this Example. A series of samples were prepared by blending an antifoam premix with a non-aqueous premix of the stabilizing particulate. The antifoam premix was prepared by using moderate speed mechanical stirring for about one hour to blend REACTION PRODUCT 1 and various surfactants. The premix containing the stabilizing particulate was prepared by sifting the silica into the non-aqueous liquid. Mixing speed was brought up to 1000 RPM for about 20 minutes. The two premixes were then combined to form the emulsion, even if only temporarily stable, by mixing the premixes at high speeds for example at 1,000 RPM for 5 minutes on Lightin® LabMaster II™. The antifoam emulsion was then added to CONCENTRATED LIQUID DETERGENT 1 to provide an antifoam addition level of 0.5 wt. % by mixing for 5 minutes at 600 RPM. The content of the premixes and the amount of each component are described in Table IV below.

TABLE IV

| | Antifoam Premix | | | Stabilizing Premix | | |
|---|---|---|---|---|---|---|
| Sample | Reaction Product1 | Surfactant | Stabilizing Aid I | | Continuous Phase | |
| A | 44.4% | 11.1% | # 3 | 2.2% | 42.2% | CONTINUOUS PHASE III |
| B | 57.0 | 14.3 | # 1 | 2.8 | 25.7 | CONTINUOUS PHASE II |
| C | 57.0 | 14.3 | # 4 | 2.8 | 25.7 | PROPYLENE GLYCOL |
| D | 64.5 | 3.2 | # 2 | 1.6 | 30.7 | CONTINUOUS PHASE II |

Example 5

This example is presented to demonstrate the utility of the present invention. A premix was made by mixing 17.5 parts of STABILIZING AID I into 402.5 parts of CONTINUOUS PHASE I with moderate mechanical stirring until the suspension was uniform. To 420 parts of this premix was added 280 parts of REACTION PRODUCT 4 with moderate stirring. The mixture was then homogenized using a Greerco mixer-homogenizer (model IL 1989) for about 30 minutes, with a cooling period, followed by another 30 minutes of homogenization. This emulsion, designated ANTIFOAM EMULSION B, had an average particle size of about a 30 microns as estimated by microscopic examination.

Sample A was prepared by mixing 0.1 parts of ANTIFOAM EMULSION B into 99.9 parts of CONCENTRATED LIQUID DETERGENT 1 with moderate stirring to form a uniform dispersion.

A comparison was made between SAMPLE A and CONCENTRATED LIQUID DETERGENT 1 alone using a standardized washing machine test. This test used a top loading U.S. washing machine run on a normal cycle with warm wash, medium hardness water (about 120 ppm as calcium carbonate), with clean ballast present in the load, and a standard detergent dosage of 131 grams. The CONCENTRATED LIQUID DETERGENT 1 developed a foam head about 8.8 cm high after only three minutes of agitation in the wash cycle and the foam extended above the lip of the agitator drum and out of the machine after about three and one-half minutes. Sample A had a controlled foaming condition throughout the wash cycle, never approached the lip of the agitator drum, and had a maximum foam height of only 1.33 cm which occurred at the end of the 12 minute wash cycle.

Example 6

This example compares the compositions of the present invention against compositions previously disclosed in the art.

An antifoam 6-1 was prepared following the method of McGee et al. disclosed in European Patent Application No.

341,952 and closely followed the method outlined in Example 25 of that disclosure. Thus, 47.5 parts of REACTION PRODUCT 2 was combined with 47.5 parts of silicone surfactant 5 and 5.0 parts of FINELY DIVIDE FILLER II. Sample 1 was prepared by mixing 0.85 parts of this antifoam into 99.15 parts of CONCENTRATED LIQUID DETERGENT 1 with moderate stirring.

Antifoam 6-2 was prepared following the method of Starch disclosed in U.S. Pat. No. 4,978,471, Example II in which 1.3 parts of SILICONE SURFACTANT 1, 2.5 parts of SILICONE SURFACTANT 6, 8.3 parts of a secondary antifoam compound of trimethylsilyl-ended polydimethylsiloxane having a viscosity of 12,500 cS at 25° C.,8.3 parts of PLURONIC L-101, and 1.25 parts of TRITON X-100 were blended into 45.0 parts of P 4000 with mechanical mixing. To this combination was added 33.3 parts of REACTION PRODUCT 2 with mixing until a uniform dispersion was formed. Sample 2 was prepared by mixing 1.0 parts of this antifoam into 99 parts of CONCENTRATED LIQUID DETERGENT 1 with moderate mixing.

Antifoam 6-3 was prepared within the spirit of the disclosure by Starch in U.S. Pat. No. 4,978,471 but using a more easily dispersible liquid continuous phase, P 425, a polypropylene glycol with an average molecular weight of 425 (marketed by Dow Chemical Company, Midland, Mich.), in place of P 4000. Antifoam 6-3 was prepared by combining 1.3 parts of SILICONE SURFACTANT 1, 2.3 parts of SILICONE SURFACTANT 6, 8.3 parts of a secondary antifoam compound of trimethylsilyl-ended polydimethylsiloxane having a viscosity of 12,500 cS at 25° C., 8.3 parts of PLURONIC L-101, and 1.25 parts of TRITON X-100 in 45.0 parts of P 425 with mechanical mixing. To this combination was added 33.3 parts of REACTION PRODUCT 2 with mixing until a uniform dispersion was formed. Sample 3 was prepared by mixing 1.0 parts of this antifoam into 99 parts of CONCENTRATED LIQUID DETERGENT 1 with moderate mixing.

Antifoams 6-4 and 6-5 were prepared following the method of Hill et al. in European Patent Application No. 499,364, by adding 0.25 parts of stannous octoate to antifoams 6-2 and 6-3, respectively, and allowing the mixture to slowly stir overnight at room temperature. Samples 4 and 5 were prepared by adding 1.0 parts of these antifoams to 99 parts of CONCENTRATED LIQUID DETERGENT 1, respectively with moderate mixing.

Antifoam 6-6 was prepared by adding 60 parts of REACTION PRODUCT 2 to a combination of 7.5 parts of SURFACTANT 1 in 82.5 parts of CONTINUOUS PHASE I with moderate mechanical stirring. Stirring was maintained for 5 hours. 10 parts of the resulting emulsion was blended with 3 parts of a 10 wt. % suspension of STABILIZING AID I in CONTINUOUS PHASE I with moderate or hand stirring. Sample 6 was prepared by adding 1.3 parts of this antifoam to 98.7 parts of CONCENTRATED LIQUID DETERGENT 1 with moderate mixing. Sample 7 was prepared by adding 1.0 parts of ANTIFOAM EMULSION B described in EXAMPLE 5 to 99 parts of CONCENTRATED LIQUID DETERGENT 1 with moderate mixing. Samples 6 and 7 are within the scope of the present invention.

Samples 1 through 7 were prepared on a 1 kg scale for the sake of the comparison and were divided into two 500 gram samples for testing. They underwent testing according to TEST METHOD 1 and TEST METHOD 2 for four days with the observations tabulated in Table V below.

TABLE V

| Sample | COLLAR Method 1 | COLLAR Method 2 | AGGREGATION Method 1 | AGGREGATION Method 2 | STABILITY Method 1 | STABILITY Method 2 |
|---|---|---|---|---|---|---|
| 1 | 5 mm thick | 5 mm thick | yes <1 mm | yes 1 to 3 mm | bad collar | collected on bottom |
| 2 | WAS NOT DISPERSIBLE | | | | | |
| 3 | 3 mm | 2.5 mm | no | no | collected on side | collected on side |
| 4 | WAS NOT DISPERSIBLE | | | | | |
| 5 | 2.5 mm | 2.0 mm | no | no | some collected | collected on side |
| 6 | <1 mm | <1 mm | no | no | uniformly dispersed | uniformly dispersed |
| 7 | <1 mm | <1.5 m | no | no | uniformly dispersed | uniformly dispersed |

It should be apparent from the foregoing that many other variations and modifications may be made in the compounds, compositions and methods described herein without departing substantially from the essential features and concepts of the present invention. Accordingly it should be clearly understood that the forms of the invention described herein are exemplary only and are not intended as limitations on the scope of the present invention as defined in the appended claims.

That which is claimed is:

1. A composition consisting essentially of:
   (I) a reaction product prepared by reacting at a temperature 50° C. to 300° C.:
   (i) 100 parts by weight of at least one polyorganosiloxane selected from the group consisting of
      (A) a polyorganosiloxane having a viscosity of about 20 to 100,000 cS at 25° C. and being expressed by the general formula $R^1{}_a SiO_{(4-a)/2}$ in which $R^1$ is a monovalent hydrocarbon or halogenated hydrocarbon group having 1 to 10 carbon atoms and a has an average value of 1.9 to 2.2 and
      (B) a polyorganosiloxane having a viscosity of 200 to about 100 million cS at 25° C. expressed by the general formula $R^2{}_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one $—OR^3$ group in each molecule, at least one such $—OR^3$ group being present at the end of the molecular chain;
   (ii) 0.5 to 20 parts by weight of at least one silicon compound selected from the group consisting of
      (a) an organosilicon compound of the general formula $R^4{}_d SiX_{4-d}$ in which $R^4$ is a monovalent hydrocarbon group having 1 to 5 carbon atoms, X is selected from the group consisting of hydroxyl and a hydrolyzable group and d has an average value of one or less,
      (b) a partially hydrolyzed condensate of said compound (a),
      (c) a siloxane resin consisting essentially of $(CH_3)_3 SiO_{1/2}$ units and $SiO_{4/2}$ units wherein the ratio of $(CH_3)_3 SiO_{1/2}$ units to $SiO_{4/2}$ units is 0.4:1 to 1.2:1, and
      (d) a condensate of said compound (c) with said compound (a) or (b);

(iii) greater than zero to 30 parts by weight of at least one finely divided filler;

(iv) a catalytic amount of a compound for promoting the reaction of components (i) to (iii);

(II) a nonaqueous liquid continuous phase selected from the group consisting of ethylene glycol, propylene glycol, polypropylene glycol, polyethylene glycol, copolymers of ethylene and propylene glycols, condensates of polypropylene glycol with polyols, condensates of polyethylene glycol with polyols, condensates of copolymers of ethylene and propylene glycols with polyols, alcohol alkoxylates, and alkylphenol alkoxylates; and (III) silica having a methanol wettability of from 30 to 70 percent.

2. A composition consisting essentially of:

(I) a reaction product prepared by reacting at a temperature of 50° C. to 300° C.:

(i) 100 parts by weight of at least one polyorganosiloxane selected from the group consisting of (A) a polyorganosiloxane having a viscosity of about 20 to 100,000 cS at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of 1.9 to 2.2 and (B) a polyorganosiloxane having a viscosity of 200 to about 100 million cS at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, at least one such —$OR^3$ group being present at the end of the molecular chain;

(ii) 0.5 to 20 parts by weight of at least one silicon compound selected from the group consisting of (a) an organosilicon compound of the general formula $R^4_d SiX_{4-d}$ in which $R^4$ is a monovalent hydrocarbon group having 1 to 5 carbon atoms, X is selected from the group consisting of hydroxyl and a hydrolyzable group and d has an average value of one or less, (b) a partially hydrolyzed condensate of said compound (a), (c) a siloxane resin consisting essentially of $(CH_3)_3 SiO_{1/2}$ units and $SiO_{4/2}$ units wherein the ratio of $(CH_3)_3 SiO_{1/2}$ units to $SiO_{4/2}$ units is 0.4:1 to 1.2:1, and (d) a condensate of said compound (c) with said compound (a) or (b);

(iii) a catalytic amount of a compound for promoting the reaction of components (i) and (ii);

(II) a nonaqueous liquid continuous phase selected from the group consisting of ethylene glycol, propylene glycol, polypropylene glycol, polyethylene glycol, copolymers of ethylene and propylene glycols, condensates of polypropylene glycol with polyols, condensates of polyethylene glycol with polyols, condensates of copolymers of ethylene and propylene glycols with polyols, alcohol alkoxylates, and alkylphenol alkoxylates; and (III) silica having a methanol wettability of from 30 to 70 percent.

3. The composition according to claim 1, further consisting essentially of (IV) at least one nonionic silicone surfactant.

4. The composition according to claim 1, further consisting essentially of (V) a nonreinforcing inorganic filler.

5. The composition according to claim 3, further consisting essentially of (V) a nonreinforcing inorganic filler.

6. The composition according to claim 4, wherein said nonreinforcing inorganic filler is micronized quartz.

7. The composition according to claim 1, wherein said reaction product (I) additionally contains up to 20 parts by weight of:

(v) a polyorganosiloxane having a viscosity of 5 to 200 cS at 25° C. and being expressed by the general formula $R^5_e(R^6O)_f SiO_{(4-e-f)/2}$ in which $R^5$ is a monovalent hydrocarbon or halogenated hydrocarbon group having 1 to 10 carbon atoms, $R^6$ is hydrogen or a monovalent hydrocarbon group having 1 to 10 carbon atoms, e is from 1.9 to 2.2 and f has a sufficiently large value to give at least two —$OR^6$ groups in each molecule at the end of a molecular chain.

8. The composition according to claim 7, wherein said polyorganosiloxane (A) is a trimethylsilyl-terminated polydimethylsiloxane having a viscosity of about 350 to 15,000 cS at 25° C., said polyorganosiloxane (B) is a hydroxyl-terminated polydimethylsiloxane having a viscosity of about 1,000 to 50,000 cS at 25° C., and said polyorganosiloxane (v) is a hydroxyl-terminated polydimethylsiloxane having a viscosity of about 10 to 50 cS at 25° C. and wherein $R^1$ is a methyl radical.

9. The composition according to claim 7, wherein said finely divided filler (iii) is fumed silica and said silicon compound (ii) is selected from the group consisting of alkyl polysilicates in which the alkyl group has 1 to 5 carbon atoms and said siloxane resin (c).

10. The composition according to claim 9, wherein said silicon compound (ii) is selected from the group consisting of alkyl polysilicates in which the alkyl group has 1 to 5 carbon atoms and said siloxane resin (c).

11. The composition according to claim 1, wherein compound (iv) is potassium silanolate.

12. The composition according to claim 3, wherein said nonionic silicone surfactant is selected from the group consisting of (i) a trimethylsilyl endcapped polysilicate which has been condensed with a polyalkylene glycol in a solvent;

(ii) a trimethylsilyl endcapped polysilicate which has been condensed with a diester in a solvent; and (iii) a copolymer of polymethylsiloxane and polyalkylene oxide in a solvent.

13. The composition according to claim 12, wherein said solvent is a polypropylene glycol-polyethylene glycol copolymer.

14. The composition according to claim 1, wherein said polyorganosiloxane (B) is a hydroxyl-terminated polydimethylsiloxane having a viscosity of about 1,000 to 50,000 cS at 25° C., said silicon compound (ii) is siloxane resin (c), and said compound (iv) is potassium silanolate.

15. The composition according to claim 1, wherein said nonaqueous liquid continuous phase (II) is selected from the group consisting of polypropylene glycol, polyethylene glycol, and copolymers of propylene glycol and ethylene glycol.

16. The composition according to claim 1, wherein said silica is a silica having a methanol wettability of from 35 to 55 percent.

17. A composition prepared by mixing:

(I) a reaction product;

(II) a nonaqueous liquid continuous phase selected from the group consisting of ethylene glycol, propylene glycol, polypropylene glycol, polyethylene glycol, copolymers of ethylene and propylene glycols, condensates of polypropylene glycol with polyols, condensates of polyethylene glycol with polyols, condensates of copolymers of ethylene and propylene glycols with polyols, alcohol alkoxylates, and alkylphenol alkoxylates; and (III) silica having a methanol wettability of from 30 to 70 percent, wherein said reaction product is prepared by reacting at a temperature of 50° C. to 300° C. the following ingredients:

(i) 100 parts by weight of at least one polyorganosiloxane selected from the group consisting of (A) a polyorganosiloxane having a viscosity of about 20 to 100,000 cS at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of 1.9 to 2.2 and (B) a polyorganosiloxane having a viscosity of 200 to about 100 million cS at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, at least one such —$OR^3$ group being present at the end of the molecular chain;

(ii) 0.5 to 20 parts by weight of at least one silicon compound selected from the group consisting of (a) an organosilicon compound of the general formula $R^4_d SiX_{4-d}$ in which $R^4$ is a monovalent hydrocarbon group having 1 to 5 carbon atoms, X is selected from the group consisting of hydroxyl and a hydrolyzable group and d has an average value of one or less, (b) a partially hydrolyzed condensate of said compound (a), (c) a siloxane resin consisting essentially of $(CH_3)_3 SiO_{1/2}$ units and $SiO_{4/2}$ units wherein the ratio of $(CH_3)_3 SiO_{1/2}$ units to $SiO_{4/2}$ units is 0.4:1 to 1.2:1, and (d) a condensate of said compound (c) with said compound (a) or (b);

(iii) 0 to 30 parts by weight of at least one finely divided filler;

(iv) a catalytic amount of a compound for promoting the reaction of components (i) to (iii), with the proviso that components (I) and (III) are not mixed together without the presence of component (II).

18. The composition according to claim 17, wherein the composition further contains (IV) at least one nonionic silicone surfactant.

19. The composition according to claim 17, wherein the composition further contains (V) a nonreinforcing inorganic filler.

20. The composition according to claim 18, wherein the composition further contains (V) a nonreinforcing inorganic filler.

21. The composition according to claim 19, wherein said nonreinforcing inorganic filler is micronized quartz.

22. The composition according to claim 17, wherein compound (iv) is potassium silanolate.

23. The composition according to claim 18, wherein said nonionic silicone surfactant is selected from the group consisting of (i) a trimethylsilyl endcapped polysilicate which has been condensed with a polyalkylene glycol in a solvent;

(ii) a trimethylsilyl endcapped polysilicate which has been condensed with a diester in a solvent; and (iii) a copolymer of polymethylsiloxane and polyalkylene oxide in a solvent.

24. The composition according to claim 23, wherein said solvent is a polypropylene glycol-polyethylene glycol copolymer.

25. The composition according to claim 17, wherein said polyorganosiloxane (B) is a hydroxyl-terminated polydimethylsiloxane having a viscosity of about 1,000 to 50,000 cS at 25° C., said silicon compound (ii) is siloxane resin (c), and said compound (iv) is potassium silanolate.

26. The composition according to claim 17, wherein said nonaqueous liquid continuous phase (II) is selected from the group consisting of polypropylene glycol, polyethylene glycol, and copolymers of propylene glycol and ethylene glycol.

27. The composition according to claim 17, wherein said silica is a silica having a methanol wettability of from 35 to 55 percent.

28. A method of making a silicone antifoam comprising mixing:

(I) a reaction product prepared by reacting at a temperature of 50° C. to 300° C.:

(i) 100 parts by weight of at least one polyorganosiloxane selected from the group consisting of (A) a polyorganosiloxane having a viscosity of about 20 to 100,000 cS at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of 1.9 to 2.2 and (B) a polyorganosiloxane having a viscosity of 200 to about 100 million cS at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, at least one such —$OR^3$ group being present at the end of the molecular chain;

(ii) 0.5 to 20 parts by weight of at least one silicon compound selected from the group consisting of (a) an organosilicon compound of the general formula $R^4_d SiX_{4-d}$ in which $R^4$ is a monovalent hydrocarbon group having 1 to 5 carbon atoms, X is selected from the group consisting of hydroxyl and a hydrolyzable group and d has an average value of one or less, (b) a partially hydrolyzed condensate of said compound (a), (c) a siloxane resin consisting essentially of $(CH_3)_3 SiO_{1/2}$ units and $SiO_{4/2}$ units wherein the ratio of $(CH_3)_3 SiO_{1/2}$ units to $SiO_{4/2}$ units is 0.4:1 to 1.2:1, and (d) a condensate of said compound (c) with said compound (a) or (b);

(iii) 0 to 30 parts by weight of at least one finely divided filler;

(iv) a catalytic amount of a compound for promoting the reaction of components (i) to (iii);

(II) a nonaqueous liquid continuous phase selected from the group consisting of ethylene glycol, propylene glycol, polypropylene glycol, polyethylene glycol, copolymers of ethylene and propylene glycols, condensates of polypropylene glycol with polyols, condensates of polyethylene glycol with polyols, condensates of copolymers of ethylene and propylene glycols with polyols, alcohol alkoxylates, and alkylphenol alkoxylates; and (III) silica having a methanol wettability of from 30 to 70 percent, with the proviso that components (I) and (III) are not mixed together without the presence of component (II).

29. The method according to claim 28, further comprising adding (IV) at least one nonionic silicone surfactant.

30. The method according to claim 28, further comprising adding (V) a nonreinforcing inorganic filler.

31. The method according to claim 29, further comprising adding (V) a nonreinforcing inorganic filler.

32. The method according to claim 30, wherein said nonreinforcing inorganic filler is micronized quartz.

33. The method according to claim 28, wherein compound (iv) is potassium silanolate.

34. The composition according to claim 29, wherein said nonionic silicone surfactant is selected from the group consisting of
   (i) a trimethylsilyl endcapped polysilicate which has been condensed with a polyalkylene glycol in a solvent;
   (ii) a trimethylsilyl endcapped polysilicate which has been condensed with a diester in a solvent; and
   (iii) a copolymer of polymethylsiloxane and polyalkylene oxide in a solvent.

35. The method according to claim 34, wherein said solvent is a polypropylene glycol-polyethylene glycol copolymer.

36. The method according to claim 28, wherein said polyorganosiloxane (B) is a hydroxyl-terminated polydimethylsiloxane having a viscosity of about 1,000 to 50,000 cS at 25° C., said silicon compound (ii) is siloxane resin (c), and said compound (iv) is potassium silanolate.

37. The method according to claim 28, wherein said nonaqueous liquid continuous phase (II) is selected from the group consisting of polypropylene glycol, polyethylene glycol, and copolymers of propylene glycol and ethylene glycol.

38. The method according to claim 28, wherein said silica is a silica having a methanol wettability of from 35 to 55 percent.

* * * * *